(12) United States Patent
Ianniello

(10) Patent No.: US 8,286,676 B2
(45) Date of Patent: Oct. 16, 2012

(54) PLANT FOR ELECTROCHEMICAL FORMING OF LEAD-ACID BATTERIES

(75) Inventor: Massimiliano Ianniello, Sandra (IT)

(73) Assignee: Sovema USA, Inc., Fenton, MO (US)

( * ) Notice: Subject to any disclaimer, the term of this patent is extended or adjusted under 35 U.S.C. 154(b) by 534 days.

(21) Appl. No.: 12/489,836

(22) Filed: Jun. 23, 2009

(65) Prior Publication Data

US 2009/0314383 A1 Dec. 24, 2009

Related U.S. Application Data

(60) Provisional application No. 61/075,106, filed on Jun. 24, 2008.

(51) Int. Cl.
- B65B 1/30 (2006.01)
- H01M 2/36 (2006.01)
- E03B 11/00 (2006.01)

(52) U.S. Cl. ............. 141/198; 141/59; 429/74; 137/260

(58) Field of Classification Search .................. 141/2, 5, 141/8, 59, 65, 198, 286, 302; 294/74, 80; 137/160, 260; 429/74, 80
See application file for complete search history.

(56) References Cited

U.S. PATENT DOCUMENTS

| | | | | |
|---|---|---|---|---|
| 2,771,101 A | * | 11/1956 | Thompson | 141/57 |
| 3,556,175 A | * | 1/1971 | Wolf et al. | 141/285 |
| 4,061,163 A | * | 12/1977 | Decker et al. | 141/7 |
| 4,350,185 A | * | 9/1982 | Quist | 141/35 |
| 5,340,667 A | * | 8/1994 | Stinson et al. | 429/64 |
| 5,543,243 A | * | 8/1996 | Brecht | 429/51 |
| 5,588,970 A | * | 12/1996 | Hughett et al. | 29/623.2 |
| 5,731,099 A | * | 3/1998 | Badger et al. | 429/72 |
| 6,588,460 B1 | * | 7/2003 | Wipperfurth et al. | 141/59 |
| 6,588,461 B2 | * | 7/2003 | Morizane | 141/61 |
| 7,392,820 B2 | * | 7/2008 | Jones et al. | 137/260 |
| 8,047,241 B2 | * | 11/2011 | Reschke | 141/302 |

* cited by examiner

Primary Examiner — Timothy L Maust

(74) Attorney, Agent, or Firm — Browdy and Neimark, PLLC

(57) ABSTRACT

A plant for the forming of lead-acid battery cells includes plugs to be fitted to the openings of the cells, each plug including a first inlet duct, a second outlet duct to set up a circulation of electrolyte inside the cell and supply and balancing elements to dilute with air the inflammable gases formed in the cell and to favor the balancing of the pressure inside the cell with the external atmospheric pressure. The supply and balancing elements include a third supply and balancing duct connecting the upper part of the plug with a part of the supply tank at atmospheric pressure which introduces the electrolyte into the cell. The plant includes a fan which forms a vacuum in the suction header, drawing the electrolyte and the inflammable gases from the cells and, through the third duct, ventilating the cells without forming a vacuum inside them.

16 Claims, 3 Drawing Sheets

PLANT FOR ELECTROCHEMICAL FORMING OF LEAD-ACID BATTERIES

This Nonprovisional application claims priority under 35 U.S.C. §119(e) on U.S. Provisional Application No. 61/075,106 filed on Jun. 24, 2008, the entire contents of which are hereby incorporated by reference.

BACKGROUND OF THE INVENTION

This invention relates to a plant for electrochemical forming of lead-acid batteries, in particular for large sized industrial type lead-acid batteries, for example stationary batteries for power supply, uninterruptible power supply units, emergency current generators, standby generators, or batteries for power supply systems for driving electrical vehicles, for example forklift trucks, with drawbars.

In the industry for the production of lead-acid batteries, the electrochemical forming of the batteries, that is, the charging of the battery cells with adequate volt and ampere values, is achieved by transforming the inactive material of the cell plates into active material. The electrochemical forming therefore consists in supplying a continuous current to the cell plates of opposite polarity immersed in an electrolyte, generally a solution of sulfuric acid diluted in distilled water.

According to a prior art process for forming the batteries, the cells are firstly filled with an electrolyte with a low concentration of acid and the electrochemical forming of the plates is carried out by supplying a relatively high electrical charging current.

After forming of the plates, the low concentration electrolyte is replaced by an electrolyte with a higher concentration, the same as that used with the battery in operation.

One of the main problems for electrochemical forming of the plates is the increase in temperature of the cells. The temperature of the cells must not exceed 60° Centigrade, that is, 140° Fahrenheit, to prevent the active material of the plates being ruined.

In order to improve the cooling of the cell, a continuous flow of electrolyte is set up which is removed from cells, cooled by a cooling circuit, and then again returned into the cells.

The electrolyte is normally forced into the cell which therefore forces out the electrolyte already present in the cell.

According to the prior art solutions illustrated in FIGS. 1 to 4, special plugs are fitted in the opening of each battery cell.

FIGS. 1 and 2 illustrate a first embodiment of a prior art plug, indicated in its entirety by numeral 1, used to set up the above-mentioned circulation of electrolyte in the cell (not illustrated) during charging.

The plug 1 comprises a first inlet duct 2 through which the electrolyte is introduced inside the cell and a second outlet duct 4 through which the electrolyte is removed from the cell.

The plug 1 also comprises the sealing means 5, to form a seal and to keep it anchored to the opening fitted at the top of the cells to inspect the plates and top up the electrolyte.

According to FIG. 2, the inlet duct 2 has an end 3 which extends inside the cell to a level lower than the inner end of the outlet duct 4.

When the electrolyte, which is in the external circuit, is introduced into the cell through the duct 2, the electrolyte which was already inside the cell automatically flows through the duct 4, thereby creating a continuous flow of electrolyte circulating from the inside of the cell to the outside, and is cooled and then returned to the cell.

FIGS. 3 and 4 illustrate another embodiment of a prior art plug, indicated in its entirety by numeral 6, which is also used in this case to set up the above-mentioned electrolyte circulation, and in which there is also a housing 7 for a probe (not illustrated) to measure the temperature of the electrolyte being removed through duct 4.

Even though it is possible to use a higher charging current if the electrolyte is circulated outside the cells compared with situation with the static electrolyte inside the cells, the operation for electrochemical forming of the plates for industrial type batteries is still quite lengthy, in the order of 140-150 hours.

In particular, with the above-mentioned large sized batteries, the circulation of the electrolyte in the cells cannot exceed certain limits of flow and pressure or head.

In the cells of large sized batteries, the heating caused by the electrical charging and by the overpressure of the forced circulation of the electrolyte can deform the cell casing.

This determines limitations to the possibility to cool the electrolyte and the possibility to exceed certain current charging values for the cells.

Another problem which occurs during the forming of industrial batteries is the development of inflammable gases, especially hydrogen.

Even though there is a continuous flow of electrolyte in the cell, the gas which develops during the forming can stagnate in the upper part of the cell without finding an outlet through the duct 4.

Since the electrolyte in the cell is at an overpressure and at a high temperature, and since short circuits can sometimes be formed between the plates with opposite polarities, with consequent formation of electrical discharges and sparks, the inflammable gas, that is the hydrogen, can explode and destroy the cell.

Yet another problem for the plants for the forming of industrial batteries is the accidental discharge of electrolyte in the event of a fault to the circulation system, in particular in the event of a fault to the circulation pump and the control valves.

SUMMARY OF THE INVENTION

An aim of this invention is to improve the prior art.

Another aim of this invention is to provide a plant for the electrochemical forming of lead-acid batteries, in particular large sized lead-acid batteries, which reduces the time necessary for forming the batteries compared with the prior art plants.

A further aim of this invention is to provide a plant for the electrochemical forming of lead-acid batteries which enables forming the batteries without the risks of explosion of the cells due to the inflammable gases which can stagnate in the cells themselves.

Yet another aim of this invention is to provide a plant for the electrochemical forming of lead-acid batteries which is intrinsically safe even in the event of failure of parts of the plant, in particular in the event of failure of the part of the plant which controls the circulation of the electrolyte.

The plant for the electrochemical forming of lead-acid batteries according to this invention enables faster forming of battery cell plates compared with prior art plants, maintaining the temperature of the electrolyte below the value of 60° Centigrade, that is 140° Fahrenheit, so as not to damage the active material of the plates.

In addition, thanks to the particular layout of the inlet, outlet and supply and balancing ducts, the plant according to this invention always enables the electrolyte to be contained inside the ducts and the headers even in the event of failure of the plant itself.

The plugs to be fitted to the cells, used in the plant for the electrochemical forming of lead-acid batteries according to this invention, enable the inflammable gases to be evacuated more efficiently and to obtain a better flow of electrolyte inside the cell.

BRIEF DESCRIPTION OF THE DRAWINGS

Other characteristics and advantages of the invention are more apparent from the detailed description which follows, with reference to the accompanying figures which illustrate a preferred embodiment of a plant for the electrochemical forming of lead-acid batteries, provided merely by way of example without restricting the scope of the inventive concept, and in which.

DESCRIPTION OF THE PREFERRED EMBODIMENTS

Figure 1:
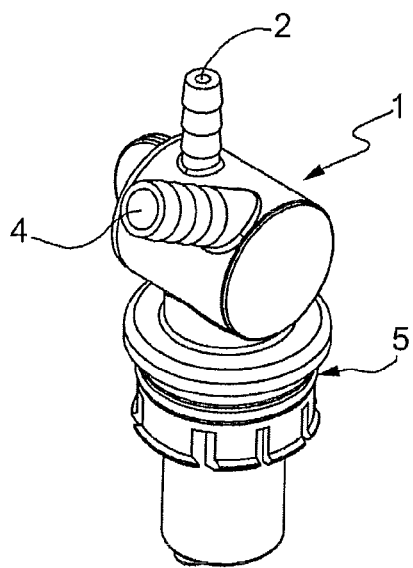
FIGS. 1 to 4 are some views of two types of plugs to be fitted to the opening of cells of lead-acid batteries in plants for forming batteries, according to the prior art.
Figure 2:
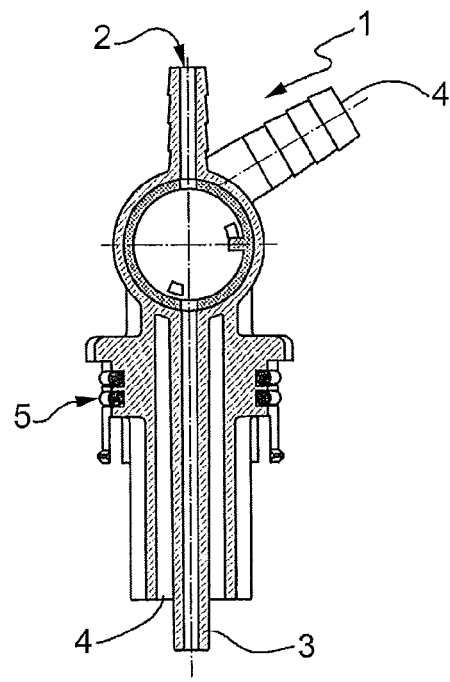
Figure 3:
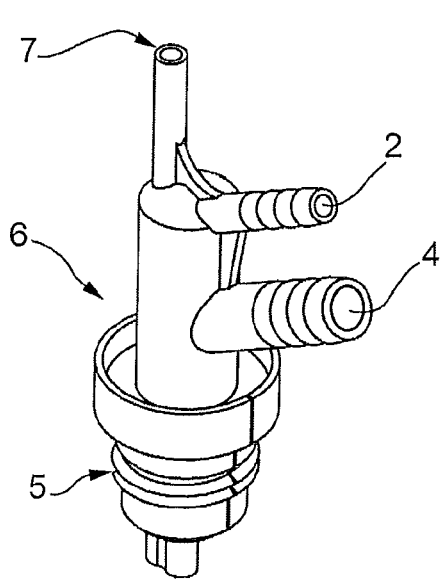
Figure 4:
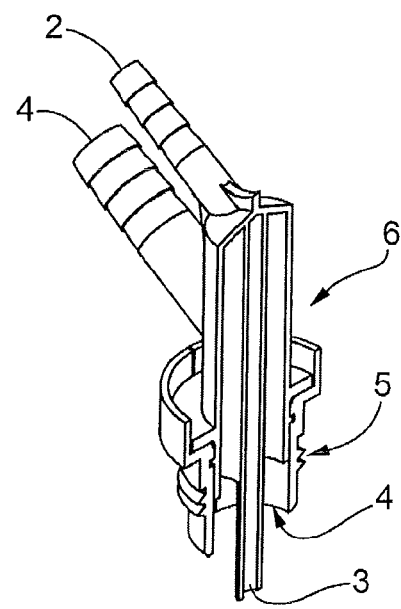
Figure 5:
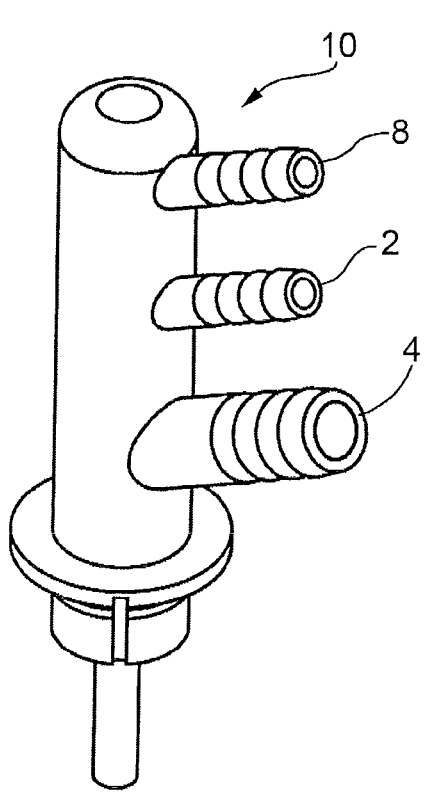
FIG. 5 is a perspective view of a preferred embodiment of a plug to be fitted to the opening of cells of lead-acid batteries in plants for forming batteries according to the present invention.
Figure 6:
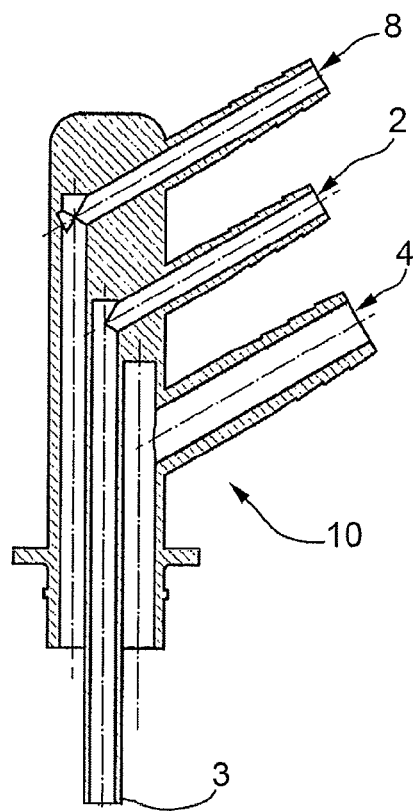
FIG. 6 is a cross-section of the plug to be fitted to the opening of cells in FIG. 5.
Figure 7:
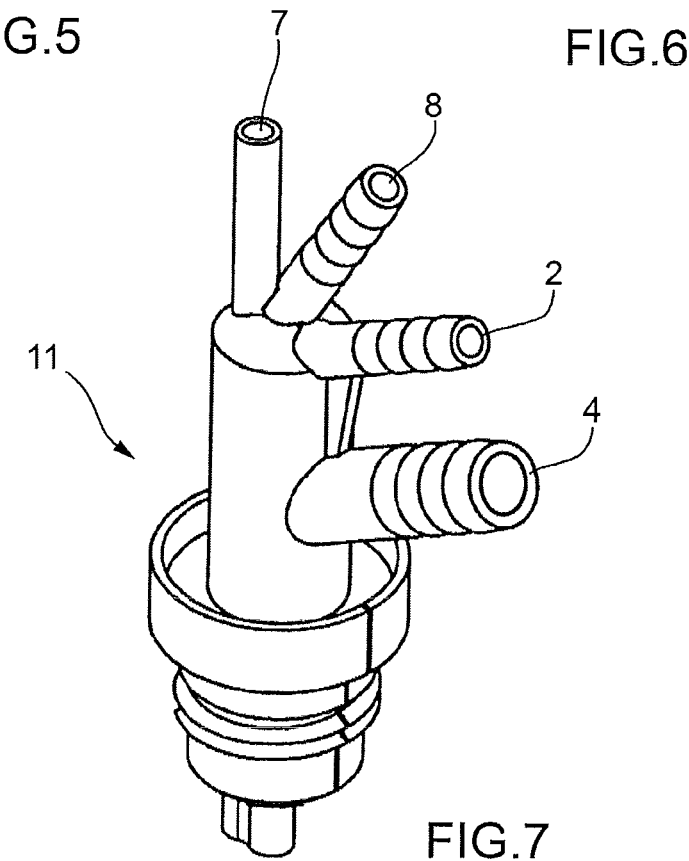
FIG. 7 is a perspective view of another preferred embodiment of a plug to be fitted to the opening of cells of lead-acid batteries in plants for forming batteries according to the present invention.

FIG. 5 to 7 illustrate some preferred embodiments of plugs to be fitted to the opening of the cells of lead-acid batteries.

FIGS. 5 and 6 illustrate a plug to be fitted to the opening of cells of lead-acid batteries according to this invention, indicated in its entirety by numeral 10. In a similar manner to the prior art plugs illustrated in FIGS. 1 to 4, and for this reason indicated with the same reference number, the plug 10 comprises a first inlet duct 2, through which the electrolyte is introduced inside the cell, and a second outlet duct 4 for the removal of the electrolyte from the cell.

The plug 10 also comprises the sealing means 5 to form a seal and to keep it anchored to the top opening of the cells.

Figure 8:
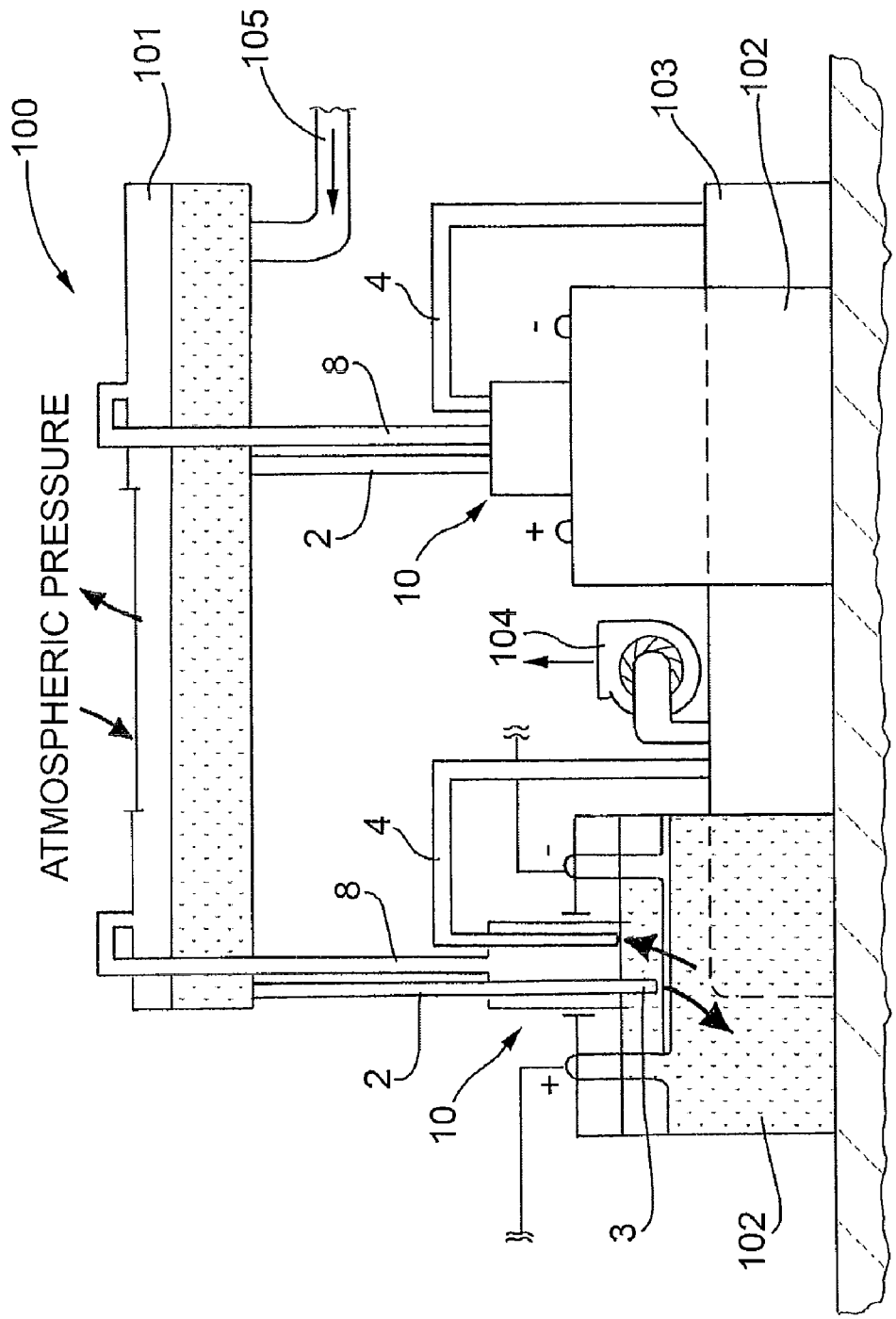
FIG. 8 is a preferred embodiment of a plant for forming batteries according to the present invention.

According to FIGS. 6 and 8, the duct 2 has an end 3 which extends inside the cell to a level lower than the inner end of the outlet duct 4.

In the same manner as the prior art plugs, the electrolyte inside the external circuit is introduced into the cell through inlet duct 2, whilst the electrolyte inside the cell is therefore forced out through the duct 4, thereby creating a continuous inflow of electrolyte.

FIG. 7 illustrates another embodiment of the plug according to this invention. According to this embodiment, a plug 11 comprises an inlet duct 2, an outlet duct 4, a supply and balancing duct 8 and also a housing 7 for a probe (not illustrated) to measure the temperature of the electrolyte flowing out through the duct 4.

FIG. 8 illustrates an embodiment of a plant 100 for the forming of lead-acid batteries according to this invention.

The plant 100 comprises a supply tank 101 to introduce electrolyte into a series of cells 102, of which only two are illustrated in FIG. 8, through inlet ducts 2. The plant 100 also comprises a suction header 103 which, through the outlet ducts 4 connected to the cells 102, draws the electrolyte out from the cells themselves.

An apparatus is fitted between the tank 101 and the header 103 which circulates and cools the electrolyte.

A supply duct 105 which carries the electrolyte to the tank 101 is visible for this apparatus; the rest of this equipment is not described in detail since it is prior art.

Between the tank 101 and the header 103 there is a head difference of a few meters of electrolyte column. The above-mentioned head enables the flow of electrolyte to be set up inside the cells 102.

An important characteristic of the plant 100 according to this invention is the presence of suction means which extract the electrolyte from the cells 102 and the presence of means for supply and balancing of the air in the cells, to avoid a vacuum inside the cells themselves and to achieve a balancing of the pressure inside the cells 102 with the outside atmospheric pressure.

These supply and balancing means comprise a third supply and balancing duct 8 which connects the upper part of the plug 10 to the upper part of the tank 101 which is at atmospheric pressure.

This supply and balancing duct 8 allows the entry of air from the outside environment which dilutes the concentration of the inflammable gases forming inside the cell 102.

The supply and balancing duct 8 also balances the pressure inside the cell 102 with the atmospheric pressure of the outside environment.

This thereby ensures that the head of the header 101 does not create an overpressure inside the cell 102 which could deform the casing of the cell itself.

The suction header 103 also comprises suction means, for example a fan 104, which generate a vacuum in the header 103 itself, producing the suction which extracts the electrolyte from the cells 102 and diluting the concentration of the inflammable gases produced by the reaction occurring in the cells during charging.

Means of control are also planned (not illustrated) which check and regulate the difference in pressure, that is, the head between the various components of the plant, and in particular between the tank 101, the header 103 and the cells 102, thereby optimizing the flow of the electrolyte in the cells themselves.

It should be noted that, in the event of failure of the part of the plant which sucks the electrolyte, that is, if the header 103 no longer draws the electrolyte out from the duct 4, the electrolyte dropping from the tank 101 through the duct 2 can flow out from the cells 102 in the supply and balancing duct 8.

Since the supply and balancing duct 8 is connected to the upper part of the tank 101 for supplying the electrolyte, the same duct 8 stops in a natural manner the flow of electrolyte due to the greater head of the liquid column which forms in the duct 8 compared with the level of electrolyte in the tank 101.

The plant according to this invention is therefore intrinsically safe without having to make use of other and specific safety devices, and it is also therefore less costly compared with similar prior art plants which, on the contrary, require these safety devices.

The invention claimed is:

1. Plant for electrochemical forming of lead-acid batteries, comprising
a series of cells of lead-acid batteries, each cell having a plug comprising an inlet duct and an outlet duct,
a supply tank for introducing electrolyte into the cells though the corresponding inlet duct, a suction header for drawing the electrolyte out from the cells through the outlet ducts thereof, an apparatus fitted between the tank and the header for circulating and cooling the electrolyte, a suction device configured to extract the electrolyte from the cells and a supply and balancing device for supplying and balancing of the air in the cells adapted to avoid a vacuum inside the cells themselves and to achieve a balancing of the pressure inside the cells with the outside atmospheric pressure, wherein an introduction of electrolyte into the cells though the inlet ducts and a discharge of electrolyte out of the cells through the outlet ducts occur simultaneously, thereby creating a continuous inflow of electrolyte among the series of cells.

2. Plant according to claim 1, wherein between the tank and the header there is a head difference.

3. Plant according to claim 2, wherein said head difference is of a few meters of electrolyte column.

4. Plant according to claim 2, wherein the supply and balancing device comprise a third supply and balancing duct which connects an upper part of the plug to an upper part of the tank which is at atmospheric pressure, thereby allowing the entry of air from the outside environment which dilutes the concentration of the inflammable gases forming inside the cell.

5. Plant according to claim 4, wherein the supply and balancing duct is connected to the upper part of the tank for supplying the electrolyte.

6. Plant according to claim 1, wherein the suction header also comprises a suction member configured to generate a vacuum in the header itself, thereby producing the suction which extracts the electrolyte from the cells and diluting the concentration of the inflammable gases produced by the reaction occurring in the cells during charging.

7. Plant according to claim 1, further comprising a control device configured to check and regulate the difference in pressure between the various components of the plant, in particular between the tank, the header and the cells, thereby optimizing the flow of the electrolyte in the cells themselves.

8. Plug to be fitted to the cells used in the plant for the electrochemical forming of lead-acid according to claim 1, comprising a first inlet duct, through which the electrolyte can be introduced inside the cell, and a second outlet duct for the removal of the electrolyte from the cell, a sealing device configured to form a seal and to keep it anchored to the top opening of the cells, wherein the inlet duct has an end which extends inside the cell to a level lower than the inner end of the outlet duct, a supply and balancing duct adapted to avoid a vacuum inside the cells themselves and to achieve a balancing of the pressure inside the cells with the outside atmospheric pressure.

9. Plant according to claim 3, wherein the supply and balancing device comprise a third supply and balancing duct which connects an upper part of the plug to an upper part of the tank which is at atmospheric pressure, thereby allowing the entry of air from the outside environment which dilutes the concentration of the inflammable gases forming inside the cell.

10. Plug to be fitted to the cells used in the plant for the electrochemical forming of lead-acid according to claim 2, comprising a first inlet duct, through which the electrolyte can be introduced inside the cell, and a second outlet duct for the removal of the electrolyte from the cell, a sealing device configured to form a seal and to keep it anchored to the top opening of the cells, wherein the inlet duct has an end which extends inside the cell to a level lower than the inner end of the outlet duct, a supply and balancing duct adapted to avoid a vacuum inside the cells themselves and to achieve a balancing of the pressure inside the cells with the outside atmospheric pressure.

11. Plug to be fitted to the cells used in the plant for the electrochemical forming of lead-acid according to claim 3, comprising a first inlet duct, through which the electrolyte can be introduced inside the cell, and a second outlet duct for the removal of the electrolyte from the cell, a sealing device configured to form a seal and to keep it anchored to the top opening of the cells, wherein the inlet duct has an end which extends inside the cell to a level lower than the inner end of the outlet duct, a supply and balancing duct adapted to avoid a vacuum inside the cells themselves and to achieve a balancing of the pressure inside the cells with the outside atmospheric pressure.

12. Plug to be fitted to the cells used in the plant for the electrochemical forming of lead-acid according to claim 4, comprising a first inlet duct, through which the electrolyte can be introduced inside the cell, and a second outlet duct for the removal of the electrolyte from the cell, a sealing device configured to form a seal and to keep it anchored to the top opening of the cells, wherein the inlet duct has an end which extends inside the cell to a level lower than the inner end of the outlet duct, a supply and balancing duct adapted to avoid a vacuum inside the cells themselves and to achieve a balancing of the pressure inside the cells with the outside atmospheric pressure.

13. Plug to be fitted to the cells used in the plant for the electrochemical forming of lead-acid according to claim 5, comprising a first inlet duct, through which the electrolyte can be introduced inside the cell, and a second outlet duct for the removal of the electrolyte from the cell, a sealing device configured to form a seal and to keep it anchored to the top opening of the cells, wherein the inlet duct has an end which extends inside the cell to a level lower than the inner end of the outlet duct, a supply and balancing duct adapted to avoid a vacuum inside the cells themselves and to achieve a balancing of the pressure inside the cells with the outside atmospheric pressure.

14. Plug to be fitted to the cells used in the plant for the electrochemical forming of lead-acid according to claim 6, comprising a first inlet duct, through which the electrolyte can be introduced inside the cell, and a second outlet duct for the removal of the electrolyte from the cell, a sealing device configured to form a seal and to keep it anchored to the top opening of the cells, wherein the inlet duct has an end which extends inside the cell to a level lower than the inner end of the outlet duct, a supply and balancing duct adapted to avoid a vacuum inside the cells themselves and to achieve a balancing of the pressure inside the cells with the outside atmospheric pressure.

15. Plug to be fitted to the cells used in the plant for the electrochemical forming of lead-acid according to claim 7, comprising a first inlet duct, through which the electrolyte can be introduced inside the cell, and a second outlet duct for the removal of the electrolyte from the cell, a sealing device configured to form a seal and to keep it anchored to the top opening of the cells, wherein the inlet duct has an end which extends inside the cell to a level lower than the inner end of the outlet duct, a supply and balancing duct adapted to avoid a vacuum inside the cells themselves and to achieve a balancing of the pressure inside the cells with the outside atmospheric pressure.

16. Plant for electrochemical forming of lead-acid batteries, comprising a series of cells of lead-acid batteries, each cell having a plug comprising an inlet duct and an outlet duct, a supply tank for introducing electrolyte into the cells though the corresponding inlet duct, a suction header for drawing the electrolyte out from the cells through the outlet ducts thereof, an apparatus fitted between the tank and the header for circulating and cooling the electrolyte, a suction device configured to extract the electrolyte from the cells and a supply and balancing device for supplying and balancing of the air in the cells adapted to avoid a vacuum inside the cells themselves and to achieve a balancing of the pressure inside the cells with the outside atmospheric pressure, wherein the supply and balancing device comprise a third supply and balancing duct which connects an upper part of the plug to an upper part of the tank which is at atmospheric pressure, thereby allowing the entry of air from the outside environment which dilutes the concentration of the inflammable gases forming inside the cell.

* * * * *